(12) United States Patent
Poligné

(10) Patent No.: US 11,614,123 B2
(45) Date of Patent: Mar. 28, 2023

(54) WHEEL BEARING OUTER RING

(71) Applicant: SKF Aerospace France S.A.S, Montigny-le-Bretonneux (FR)

(72) Inventor: Alexandre Poligné, Arthemonay (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 3 days.

(21) Appl. No.: 17/160,079

(22) Filed: Jan. 27, 2021

(65) Prior Publication Data

US 2021/0277952 A1 Sep. 9, 2021

(30) Foreign Application Priority Data

Mar. 3, 2020 (DE) .......................... 102020202695.5

(51) Int. Cl.
*F16C 33/58* (2006.01)
*F16C 35/00* (2006.01)

(52) U.S. Cl.
CPC .............. *F16C 33/58* (2013.01); *F16C 35/00* (2013.01); *F16C 2326/02* (2013.01)

(58) Field of Classification Search
CPC ...... F16C 33/58; F16C 33/581; F16C 33/583; F16C 33/586; F16C 35/00; F16C 35/067; B60B 27/0078
See application file for complete search history.

(56) References Cited

U.S. PATENT DOCUMENTS

| | | | | |
|---|---|---|---|---|
| 8,393,795 B2* | 3/2013 | Aritake | ............... | B60B 27/0005 384/489 |
| 8,465,210 B2* | 6/2013 | Yamamoto | ............ | F16C 19/386 384/589 |
| 8,567,260 B2* | 10/2013 | Nishikawa | ............ | F16C 19/186 73/862.041 |
| 9,056,523 B2* | 6/2015 | Norimatsu | .......... | B60B 27/0068 |

* cited by examiner

*Primary Examiner* — James Pilkington
(74) *Attorney, Agent, or Firm* — Garcia-Zamor Intellectual Property Law, LLC; Ruy Garcia-Zamor

(57) ABSTRACT

A wheel bearing outer ring with a plurality of fastening elements are configured to be fixed to the wheel bearing outer ring to a knuckle of a car are arranged at a radial outer side of the wheel bearing outer ring. A view of the wheel bearing outer ring with a line of vision being a central axis of the wheel bearing outer ring at least one angle between a first one of the fastening elements and a second one of the fastening elements, which are neighbouring with respect to the circumferential direction of the wheel bearing outer ring, differs from an angle between a third one of the fastening elements and one of the fastening elements, which is neighbouring to the third one of the fastening elements with respect to the circumferential direction. All the angles are measured with respect to the central axis and in the circumferential direction.

8 Claims, 3 Drawing Sheets

WHEEL BEARING OUTER RING

CROSS-REFERENCE TO RELATED APPLICATIONS

This application claims priority to German Patent Application no. 102020202695.5, filed Mar. 3, 2020, the contents of which is fully incorporated herein by reference.

TECHNICAL FIELD OF THE INVENTION

The invention relates a wheel bearing outer ring with a plurality of fastening elements.

BACKGROUND OF THE INVENTION

A wheel bearing outer ring with a plurality of fastening elements is known, which are designed as lugs. With the help of the lugs the wheel bearing outer ring is fixed to a knuckle of a car. The lugs are arranged at a radial outer side of the wheel bearing outer ring and are placed at an equal circumferential distance from each other.

SUMMARY OF THE INVENTION

The object of the invention is in particular to provide a generic wheel bearing outer ring with an increased efficiency.

The invention starts from wheel bearing outer ring with a plurality of fastening elements, which are configured for a fixation of the wheel bearing outer ring to a knuckle of a car and which are arranged at a radial outer side of the wheel bearing outer ring.

It is suggested that with respect to a view of the wheel bearing outer ring with a line of vision being a central axis of the wheel bearing outer ring at least one angle between a first one of the fastening elements and a second one of the fastening elements, which are neighbouring with respect to the circumferential direction of the wheel bearing outer ring, differs from an angle between a third one of the fastening elements and one of the fastening elements, which is neighbouring to the third one of the fastening elements with respect to the circumferential direction, wherein all the angles are measured with respect to the central axis and in the circumferential direction.

The central axis of the wheel bearing outer ring is the axis around which the wheel bearing outer ring and a wheel bearing inner ring rotate relative to each other in a state, in which the wheel bearing outer ring and the wheel bearing inner ring are assembled together in the wheel bearing. Preferably an angle between one of the fastening elements and another one of the fastening elements is to be understood as the angle between a fixation centre of the former fastening element and a fixation centre of the latter fastening element. Through this an increased efficiency can be achieved. In particular an arrangement of the fastening elements can be achieved, in which the fastening elements are positioned in such a way that they are positioned at locations where in a completely assembled state, in which the bearing outer ring is fixed to the knuckle of the car, the biggest need for transmission of forces between the wheel bearing outer ring and the knuckle occurs.

In particular it can be accomplished that in comparison to the prior art the same transmission of forces between the wheel bearing outer ring and the knuckle occurs and the wheel bearing outer ring has the same service life but has less fastening elements than the wheel bearing outer ring of the prior art. Moreover, in particular a stiff wheel bearing outer ring with a relatively small diameter can be achieved.

Preferably a fixation centre of a fastening element is a through-hole of the fastening element, wherein in a state, in which the wheel bearing outer ring is fixed to the knuckle, this fixation is done in part by a screw which extends through the through-hole. For example the fastening elements can be lugs with through-holes.

Furthermore, it is suggested that the number of the fastening elements is at most four. Thereby a low mass of the wheel bearing outer ring is achieved.

Preferably in the view central fixation points of three fastening elements are within an angle of 90°, more preferably of 80° and even more preferably of 70°, wherein the angle is measured with respect to the central axis and in the circumferential direction. Through this three fastening elements are concentrated in a region of the wheel bearing outer ring, which has to transmit high forces when it is assembled and used in a car.

With advantage in the view one of the fastening elements is positioned a first angle away from a first neighbouring one of the fastening elements and is positioned a second angle away from a second neighbouring one of the fastening elements and the first angle differs at most by twenty percent of the first angle from the second angle. Thereby a low mass of the bearing outer ring and a similar or equal design of these fastening elements can be accomplished.

Moreover, it is suggested that two of the fastening elements lie with respect to a radial direction approximately opposite to each other. Through this a lightweight construction of the wheel bearing outer ring together with a very good transmission of forces from the car to a street on which it drives can be achieved, in particular in bends.

Preferably the fastening elements extend in the view less than 40°, more preferably less than 30° in circumferential direction. Thereby stable construction with a low mass is accomplished.

Furthermore, it is suggested that all of the fastening elements are intersected by at least one imaginary plane, which is perpendicular to the central axis. In this way a geometrically simple design can be achieved.

Preferably the wheel bearing outer ring is part of a motor vehicle. With advantage a radial direction of extension of at least one of the fastening elements points vertically upwards in a condition in which the motor vehicle stands on a completely plain underground. Through this a good transmission of forces from the motor vehicle to the underground primarily in bends can be achieved.

Moreover, a structural unit with a wheel bearing outer ring as described above and with a knuckle, to which the wheel bearing outer ring is fixed, is suggested. Advantages in this respect were already described. Preferably the structural unit is part of a motor vehicle.

BRIEF DESCRIPTION OF THE DRAWINGS

Further advantages result from the following drawing description. The drawings show an example of the invention. The drawings, description and claims contain numerous features in combination. It is advisable for the skilled person to look at the features individually and to combine them into useful further combinations.

DETAILED DESCRIPTION OF SOME EMBODIMENTS

Figure 1:
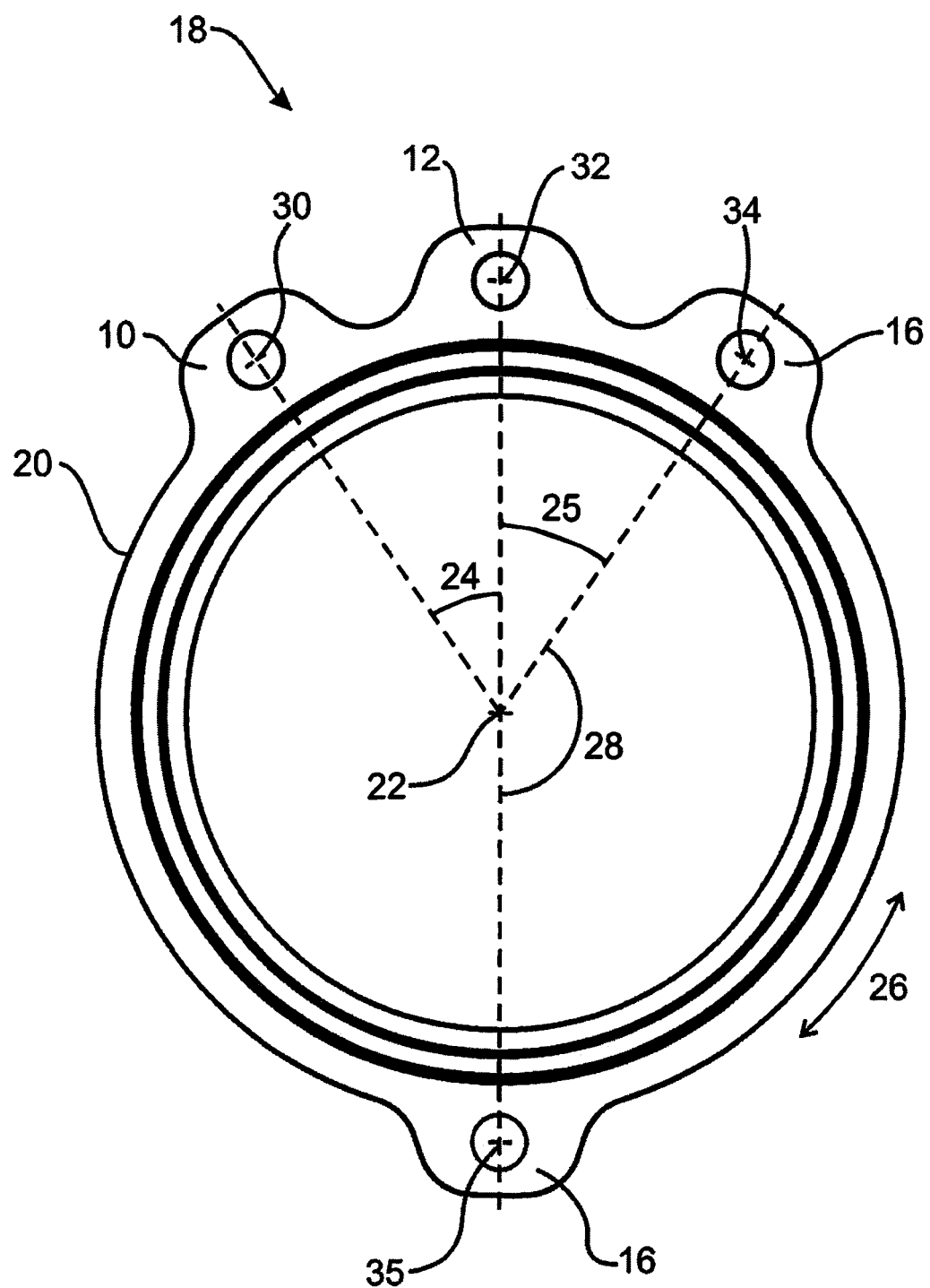
FIG. 1 shows a plan view of a face side of a wheel bearing outer ring.
Figure 1A:
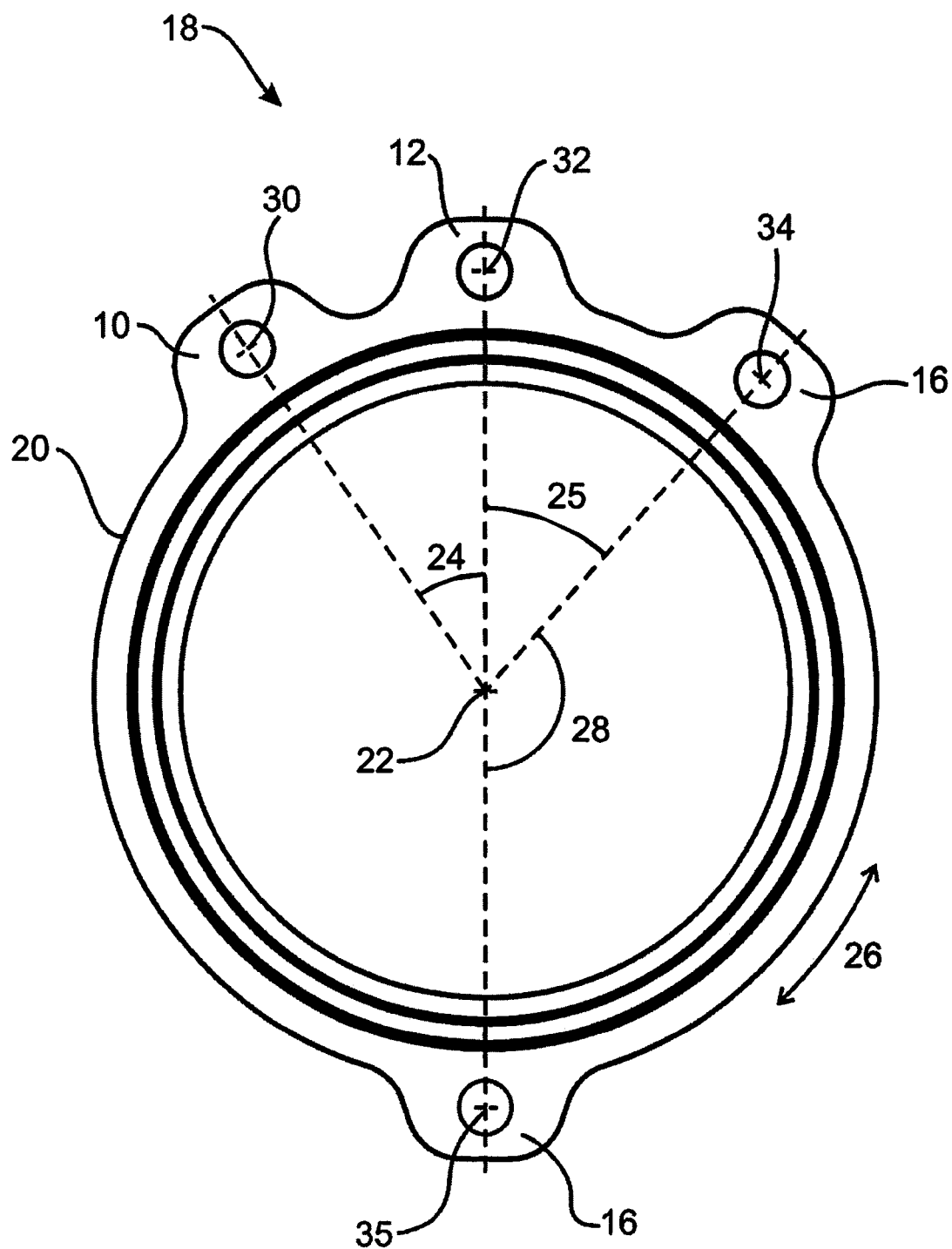
FIG. 1A shows a plan view of a face side of a wheel bearing outer ring which illustrates angles 24 and 25 differing by no more than twenty percent (20%).

FIG. 1 shows a plan view of a face side of a wheel bearing outer ring 18 with a plurality of fastening elements 10, 12, 14, 16, which are geometrically identical. Each of the fastening elements 10, 12, 14, 16 is a lug with a through-hole which extends parallel to central axis 22 of the wheel bearing outer ring. FIG. 1 shows the wheel bearing outer ring in an unassembled state. The wheel bearing outer ring can be assembled to a knuckle of a car by putting a screw through each of the through holes of the fastening elements and screwing them into inner threads of the knuckle. The surface against which the fastening elements abut can for example have the geometry of the base surface of a hollow cylinder with holes for the screws. The fastening elements are arranged at the radially outer side 20 of the wheel bearing outer ring.

The first fastening element 10 and the second fastening element 12 include a first angle 24. This angle and all further angels are measured with respect to the central axis 22. Each of the fastening elements 10, 12, 14, 16 comprises a central fixation point 30, 32, 34, 35. An angle between two fastening elements is always measured between their central fixation points. In a view of the wheel bearing outer ring with line of vision being the central axis 22 the first fastening element 10 and the second fastening element 12 include an angle 24. The angle 24 can be for example 34°. The fastening element 10 and the fastening element 12 are neighbouring with respect to a circumferential direction 26 of the wheel bearing outer ring, which means that with respect to the circumferential direction 26 there are no other fastening elements between the fastening elements 10, 12. Furthermore, the fastening element 14 and fastening element 16, which are also neighbouring with respect to the circumferential direction 26, include an angle 28. The angle 28 is different from the angle 24 and can be for example 146°. The fastening elements 10, 12, 14, 16 are the only fastening elements which are comprised by the wheel bearing outer ring.

Figure 2:
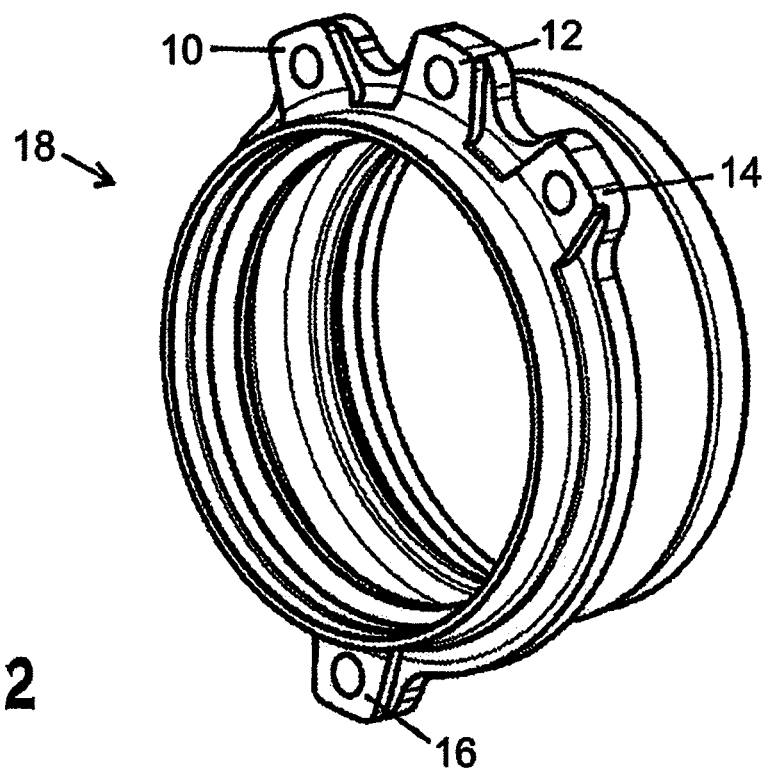
FIG. 2 shows a perspective view of the wheel bearing outer ring.
Figure 3:
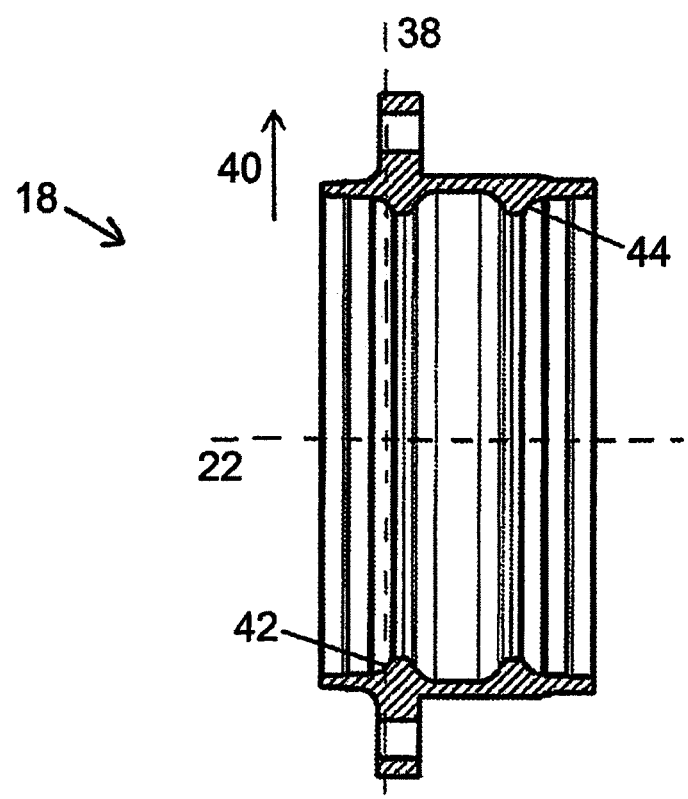
FIG. 3 shows an axial section of the wheel bearing outer ring.

Moreover, the fastening element 12 includes an angle 25 with the fastening element 14. The angle 25 can have a value of 34°. Therefore the angles 24 and 25 don't differ at all. The central fixation points 30, 32, 34 of the fastening elements 10, 12, 14 are with respect to the circumferential direction 26 positioned within an angle of 70°. The fastening element 12 and the fastening element 16 include an angle of 180° and lie therefore with respect to a radial direction 40 of the wheel bearing outer ring opposite to each other (FIGS. 1 to 3).

The radial direction 40 is the direction in which the fastening element 12 extends. In a condition, in which the wheel bearing outer ring is assembled to a knuckle of a motor vehicle, which stands on a completely plain and horizontal underground, the radial direction 40 points vertically upwards.

Each of the fastening elements extends in the view with the line of vision being the central axis 22 less than 40° in the circumferential direction 26. Moreover, all of the fastening elements 10, 12, 14, 16 lie in the same plane. Therefore an imaginary plane 38, which is perpendicular to the central axis 22, intersects all of the fastening elements 10, 12, 14, 16.

The wheel bearing outer ring comprises at its radially inner side raceways 42, 44 for a rolling contact with rolling elements. In the shown embodiment the rolling elements are balls.

The wheel bearing outer ring is in an assembled state a part of a hub bearing unit. Hub bearing units are allowing the rotation and the attachment of a wheel to a car suspension system. It is mainly subjected to flexion around the horizontal axis along the length of the car.

In the case, in which the wheel bearing outer ring has to withstand a maximum load, the upper half of the wheel bearing outer ring has to withstand traction and the lower half of the wheel bearing outer ring has to withstand compressive strain. It was recognized that the efficiency of the wheel bearing outer ring is increased when the upper half comprises more fastening elements than the lower half.

The arrangement of the fastening elements does not affect the geometry of the rest of the wheel bearing outer ring.

The invention claimed is:

1. A wheel bearing outer ring comprising:
   at least three fastening elements that are configured to fix the wheel bearing outer ring to a knuckle of a car and which are arranged at a radial outer side of the wheel bearing outer ring;
   the wheel bearing outer ring has a central axis;
   wherein when viewing the wheel bearing outer ring from a direction along the central axis a vertical axis is defined between the central axis and a fixation point of a middle located one of the three fastening elements such that a first angle is formed between the vertical axis and a line extending radially outwardly from an intersection of the vertical axis and the central axis to a second fixation point in a middle of one of the other two fastening elements;
   wherein a second angle is formed between the vertical axis and a second line extending radially outwardly from an intersection of the vertical axis and the central axis to a third fixation point in a middle of the other of the two fastening elements; and
   wherein the first angle and the second angle are different, a first radial outer surface of the wheel bearing outer ring along the first angle having a central portion that is concave and a second radial outer surface of the wheel bearing outer ring along the second angle having a central portion that is concave.

2. The wheel bearing outer ring according to claim 1, wherein the number of the fastening elements is at most four.

3. The wheel bearing outer ring according to claim 1, wherein two of the fastening elements lie with respect to a radial direction of the wheel bearing outer ring approximately opposite to each other.

4. The wheel bearing outer ring according to claim 1, wherein the first angle and/or the second angle is less than forty degrees (40°).

5. The wheel bearing outer ring according to claim 1, wherein all of the fastening elements are intersected by at least one imaginary plane that is perpendicular to the central axis.

6. A structural unit comprising:
   a wheel bearing outer ring of claim 1, and
   a knuckle to which the wheel bearing outer ring is fixed.

7. A wheel bearing outer ring comprising:
   at least three fastening elements that are configured to fix the wheel bearing outer ring to a knuckle of a car and which are arranged at a radial outer side of the wheel bearing outer ring;
   the wheel bearing outer ring has a central axis;

wherein when viewing the wheel bearing outer ring from a direction along the central axis a vertical axis is defined between the central axis and a fixation point of a middle located one of the three fastening elements such that a first angle is formed between the vertical axis and a line extending radially outwardly from an intersection of the vertical axis and the central axis to a second fixation point in a middle of one of the other two fastening elements;

wherein a second angle is formed between the vertical axis and a second line extending radially outwardly from an intersection of the vertical axis and the central axis to a third fixation point in a middle of the other of the two fastening elements; and wherein the first angle and the second angle are different, a sum of the first angle and the second angle is less than ninety (90) degrees.

8. A wheel bearing outer ring comprising:

at least three fastening elements that are configured to fix the wheel bearing outer ring to a knuckle of a car and which are arranged at a radial outer side of the wheel bearing outer ring;

the wheel bearing outer ring has a central axis;

wherein when viewing the wheel bearing outer ring from a direction along the central axis a vertical axis is defined between the central axis and a fixation point of a middle located one of the three fastening elements such that a first angle is formed between the vertical axis and a line extending radially outwardly from an intersection of the vertical axis and the central axis to a second fixation point in a middle of one of the other two fastening elements;

wherein a second angle is formed between the vertical axis and a second line extending radially outwardly from an intersection of the vertical axis and the central axis to a third fixation point in a middle of the other of the two fastening elements; and wherein the first angle and the second angle are different, the first angle and the second angle differ by no more than twenty (20) percent.

* * * * *